United States Patent
Bottoms, Jr. et al.

[11] Patent Number: 5,495,546
[45] Date of Patent: Feb. 27, 1996

[54] FIBER OPTIC GROUNDWIRE WITH COATED FIBER ENCLOSURES

[76] Inventors: Jack Bottoms, Jr., 12090 Lonsdale La., Roswell, Ga. 30075; Charles L. Carter, 350 Singletree Trace, Alpharetta, Ga. 30201

[21] Appl. No.: 227,251

[22] Filed: Apr. 13, 1994

[51] Int. Cl.$^6$ ................................................. G02B 6/44
[52] U.S. Cl. ........................................ 385/101; 385/113
[58] Field of Search ................................ 385/100, 101, 385/109, 110, 111, 113; 174/70 R, 95–97, 103, 108

[56] References Cited

U.S. PATENT DOCUMENTS

| | | | |
|---|---|---|---|
| 32,374 | 3/1987 | Dey et al. | 350/96.23 |
| 4,078,853 | 3/1978 | Kempf et al. | 350/96.23 |
| 4,359,598 | 11/1982 | Dey et al. | 174/40 R |
| 4,416,508 | 11/1983 | Dey et al. | 350/96.23 |
| 4,491,386 | 1/1985 | Negishi et al. | 350/96.23 |
| 4,491,387 | 1/1985 | Dey et al. | 350/96.23 |
| 4,497,164 | 2/1985 | Dotti et al. | 57/6 |
| 4,623,218 | 11/1986 | Laurette et al. | 385/101 |
| 4,632,506 | 12/1986 | Taylor | 174/70 R |
| 4,757,675 | 7/1988 | Oglesby et al. | 57/6 |
| 4,775,213 | 10/1988 | Kitayama | 350/96.23 |
| 4,784,461 | 11/1988 | Abe et al. | 350/96.23 |
| 4,793,686 | 12/1988 | Saito | 385/101 |
| 4,801,192 | 1/1989 | Wehner | 350/96.23 |
| 4,807,962 | 2/1989 | Arroyo et al. | 350/96.23 |
| 4,865,415 | 9/1989 | Kitayama | 350/96.23 |
| 4,944,570 | 7/1990 | Oglesby et al. | 350/96.23 |
| 5,082,379 | 1/1992 | Lindner et al. | 385/101 |
| 5,195,158 | 3/1993 | Bottoms et al. | 385/105 |
| 5,204,926 | 4/1993 | Bottoms et al. | 285/105 |
| 5,274,725 | 12/1993 | Bottoms et al. | 385/105 |

FOREIGN PATENT DOCUMENTS

| | | | |
|---|---|---|---|
| 0076637 | 4/1983 | European Pat. Off. | G02B 5/16 |
| 0146757 | 11/1984 | European Pat. Off. | G02B 6/44 |
| 0328409 | 8/1989 | European Pat. Off. | |
| 58-59508 | 4/1983 | Japan . | |
| 58-59507 | 4/1983 | Japan . | |
| 1453402 | 10/1976 | United Kingdom | G02B 5/16 |
| 1598438 | 1/1978 | United Kingdom | G02B 5/14 |
| 2157848 | 10/1985 | United Kingdom . | |

OTHER PUBLICATIONS

Design and Performance Review of Optical Static Wire "A Second Generation"; Author: Cornelison, et al; Date: 1986, Jan.

Optical Fiber Communications–Principles and Practice; Author: Senior, John M.; Date: 1984, Jan.

Fiber Optics Applications in Transmission Line Design at Duke Power Company; Author: Parker, et al., paper; Apr., 1985.

Hitachi OPGW Composite Fiber Optic Overhead Ground Wire; Author: Hitachi Cable, Ltd.; Printed: Apr. 1990.

Sumitomo Electric Industries OPGW; Author: Alcan Cable; Date: Feb., 1986.

Composite Fiber–Optic Overhead Ground Wire OPGW; Author: Alcan Sumitomo; Date: 1987, Jan.

(List continued on next page.)

*Primary Examiner*—Rodney B. Bovernick
*Assistant Examiner*—Robert E. Wise
*Attorney, Agent, or Firm*—Jones & Askew

[57] ABSTRACT

The present invention is directed toward an optic static wire assembly comprising a central core which has one or more helical channels in its periphery. One or more tubes containing a dielectric water-blocking compound and one or more optical fibers are positioned in the channels. The tubes are coated with a thermal insulation material, and then a heat reflective material. The optical fibers are randomly arranged within the tubes in such a way that tensile stresses on the cable are not transmitted to them. Finally, the assembly formed by the core and the tube or tubes is wrapped with a serving of metal wires. In one embodiment, the core and tubes may be wrapped with a tape layer before the outer metal wires are applied. Any interstices among the core, the tube or tubes, and tape may also be filled with another dielectric water-blocking compound.

21 Claims, 3 Drawing Sheets

OTHER PUBLICATIONS

Improved Composite Fiber–Optic Overhead Ground Wire; Author: Saito et al. (Sumitomo): Date: 1984, Jan.

Long–Term Reliability of Optical Fiber Composite Ground Wire; Author: Ogai et al. (Furukawa); Date: 1985, Jan.

New Composite Fiber–Optic Overhead Ground Wire; Author: Nishiyama, et al.; Date: 1986, Jan.

Development of High Performance Composite Fiber–Optic Overhead Ground Wire; Author: Nagaki, et al.; Date: 1986, Jan.

Optical Fiber Ground Wire; Author: Bianchi, et al.; 1987, Jan.

Development of Optical Ground Wire for 1.55 um Wavelength; Author: Lin et al. (Sumitomo); Date: 1987, Jan.

Suitable Design and characteristics of Optical Ground Wire for 1.55 um Wavelength; Author: Kawasaki et al. (Hitachi); Date: 1988, Jan.

Optical Ground Wire Design With A Minimum of Dielectics; Author: Schneider, et al.; Date: 1988, Jan.

Development of a Composite Fiber–Optic Ground Wire; Author: Kawahira et al.; Date: 1984, Jan.

Composite Fiber–Optic Overhead Ground Wire; Author: Igarashi, et al.; Date: 1980, Jan.

Optical Static Wire Product Specifications; Author: Ericsson, production; Date: 1986, Jan.

Fibral Delivers Communications and Power in One Cable on Three Continents; Author: Phillips Cables, Inc.; Date: 1987, Jan.

Optical Static Wire; Author: Reynolds/Ericsson; Date: 1986, Jan.

Overhead Line Conductors Containing Optical Fibers—a New Approach To; Author: Alexander, Phillips; Date: 1984, Jan.

Alcoa Fujikura Ltd.—Optical Fiber Cables and Systems; Author: Alcoa Fujikura Ltd.; Date: 1986, Jan.

Reynolds Ericsson—Fiber Optic Cable Products; Author: Reynolds Ericsson; Date: 1986, Jan.

Alcoa Fujikura Ltd. Optical Fiber Cables and Systems; Author: Alcoa Fujikura, Ltd.; Date: 1986, Jan.

Optopia—Composite Fiber–Optic Overhead Ground Wires OPGW's; Author: Sumitomo Electric; Date: 1984, Jan.

Composite Fiber–Optic Ground Wire; Author: Matsubara et al; Date: 1986, Jan.

Appendix A—Optical Requirements; Author: Alcoa Fujikura Ltd.; Date: 1989, Jan.

Reynolds/Ericsson Fiber Optic Cable Products; Author: Reynolds/Ericsson; Date: 1985, Jan.

Optical Ground Wire; Author: Reynolds Metals; Date: Sep. 24, 1985.

Alternative Approaches to Optical Fibre Cable Making; Author: Slaughter, et al., Date: 1977, Jan.

Optical Fibre Packaging in Loose Fitting Tubes of Orientated Polymer; Author: Jackson, et al., Optical; Date Mar. 7, 1977.

Optical Fibre Communication; Author: book, Technical Staff CSAT, 1980, Jan.

Spheriglass: Solid Glass Spheres; Author: Potters Industries Inc.; Date: 1992 Jan.

Sphericel: Hollow Glass Spheres; Author: Potters Industries Inc.; Date: 1991. Jan.

Conduct–O–Fil: Conductive Additives; Silver Coated Solid Glass Spheres; Author: Potters Industries Inc., Date: 1991, Jan.

Conduct–O–Fil: Conductive Additives; PI–1040; Author: Potters Industries Inc.; Date: 1992. Jan.

Conduct–O–Fil: Conductive Additives; SA270S20; Author: Potters Industries Inc.; Date: 1992. Jan.

Conduct–O–Fil: Conductive Additives; SH400S33; Author: Potters Industries Inc.; Date: 1991. Jan.

Conduct–O–Fil: Conductive Additives; SM325F55; Author: Potters Industries Inc.; Date: 1991. Jan.

Temperature Rise of Optical Fiber Ground Wires Subjected to Short Duration–High Current Transients Author: Black, W. Z., et al., Date Jan. 1989 IEEE.

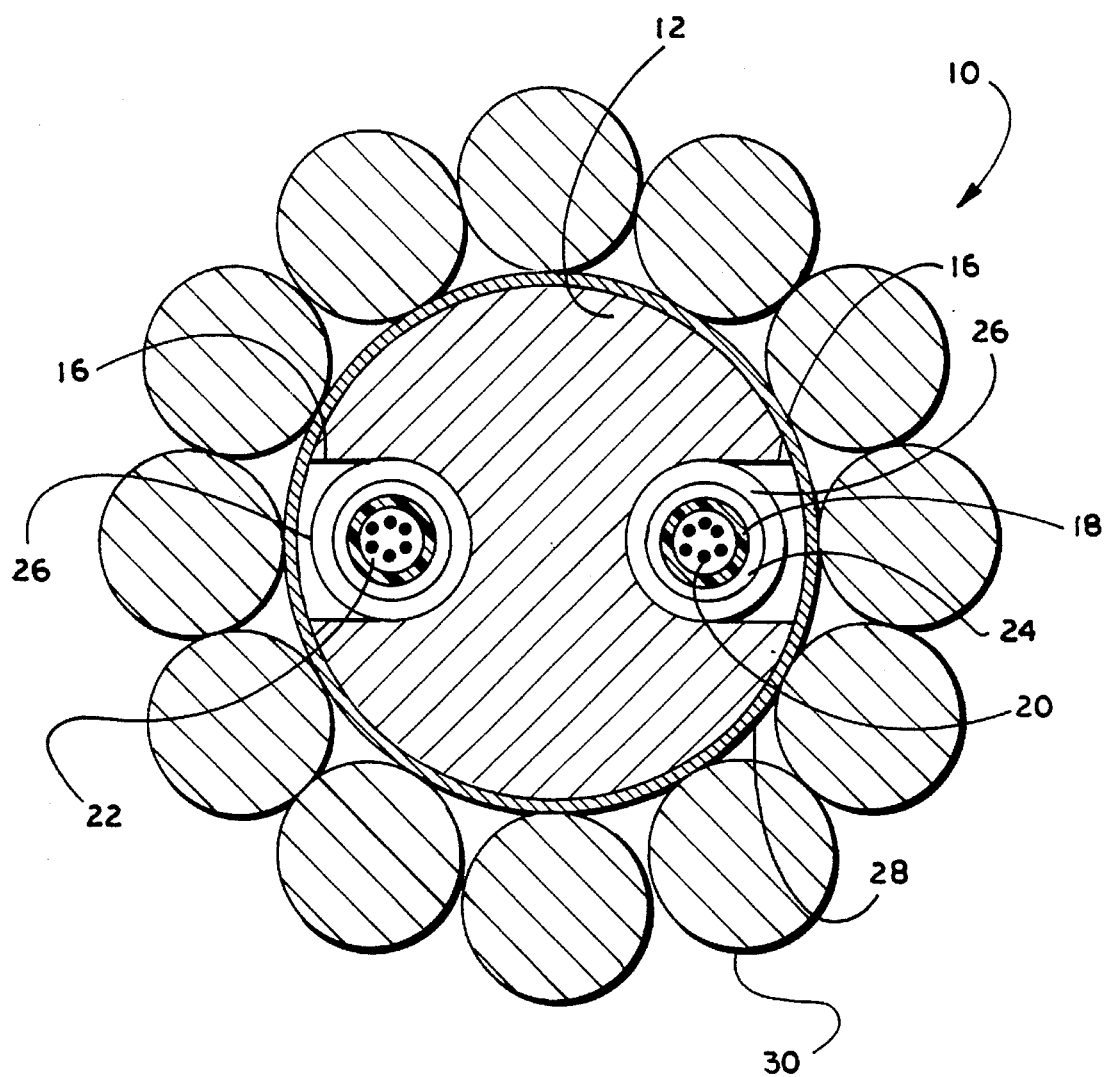
Fig_1

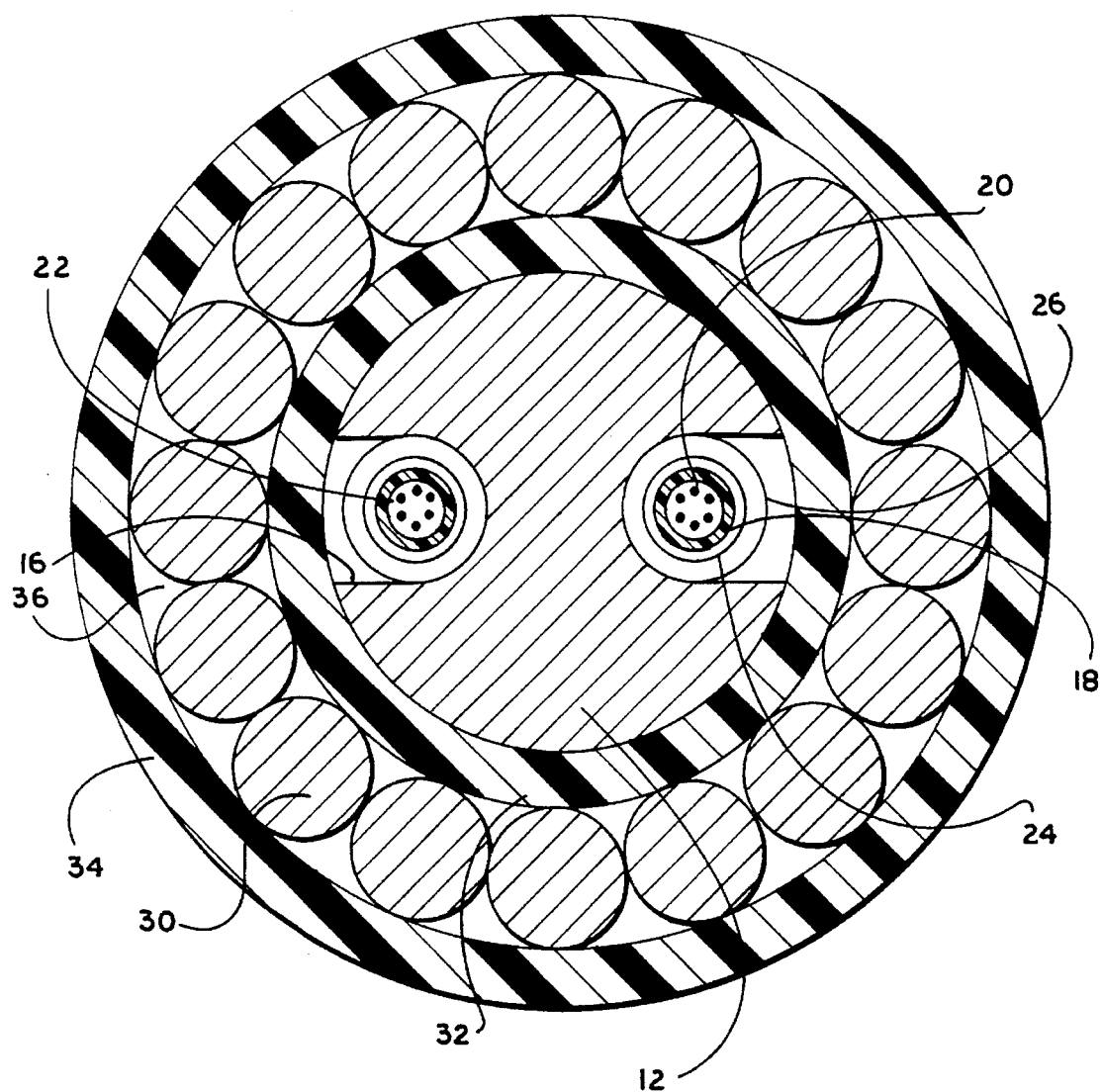
Fig_3

FIBER OPTIC GROUNDWIRE WITH COATED FIBER ENCLOSURES

BACKGROUND OF THE INVENTION

The present invention relates to fiber optic telecommunication cables and static-wires used with overhead high-voltage power transmission lines.

With the advent of fiber optic cables, high volume communication has no use for the copper cables which are bulky and cumbersome to manufacture and install. For example, a single glass fiber having a coated diameter of only 250 micrometers can transmit information at a rate of 565 million bits (about 35,000 typed pages) per second. The non-conducting or "all-dielectric" attribute of optical fibers allows them to be used in applications unsuitable for metal conductor containing cables, such as along existing utility power transmission rights of way, since the problems associated with induced voltages are avoided.

Although seemingly fragile, the glass optical fibers are individually very strong. Short-length fibers have shown tensile strengths between 400 KPSI and 800 KPSI at elongations ranging from 4% to 8%. However, telecommunication grade fibers are proof-tested over their entire length within the range of 50 KPSI to 100 KPSI. Glass defects that may cause fracture at higher stresses will not be detected nor removed. Furthermore, long-term stress even below the short-term, proof-test level can cause fatigue failure due to crack propagation at defect sites in an otherwise acceptable fiber. Because fiber cables are subjected to various tensile stresses during normal installation and use, a cable design which minimizes the transfer of these loads to the fibers will have increased reliability.

Outdoor, above-ground installations continuously expose cables to the elements, which can be harsh. During installation, an overhead cable is passed through a series of installation blocks under relatively low stringing tension and then raised to the design tension of the line: typically in the range of 1,000 to 5,000 lbs. for a 500-foot span. Overhead cables (called static wires) typically have rated breaking strengths in the range of 10,000 lbs. to 30,000 lbs. In-service tension can increase to 60% of the rated strength as a result of severe weather conditions, such as ice loading, and under extraordinary conditions, the tension can increase to as much as 95% of or even exceed the rated strength.

In addition to the stress conditions introduced during installation, the cable must be able to withstand environmental temperatures typically in the range of −40° C. to +70° C. Moreover, the resulting cyclical thermally induced expansion/contraction of the cable should be isolated from the fibers to avoid fatigue failures and other effects on the fiber transmission characteristics. The fibers also must be protected from the elements, especially water, and from hydrogen because it is well known that these can cause increased attenuation in silica glass fibers and accelerated fatigue failure due to increased hydroxyl ion concentration. Besides being water-tight and corrosion-resistant, the cable materials should allow any hydrogen generated within the cable to diffuse to the atmosphere.

These cables are typically installed in overhead, high-voltage power transmission lines via conductors suspended from a series of towers or pylons. For efficiency, a load-balanced delta connection may be used having one conductor for each of the three electrical phases. Whether from a lightning strike or other electrical disturbance, one or more of the phase conductors is occasionally unable to carry its share of the power. To avoid a total loss of the transmission system in that case, auxiliary conductors called static wires are often provided to carry the fault currents. The static wires are normally suspended above the phase conductors from the same transmission towers and thus are also exposed to lightning surge currents. As already observed, it is advantageous to carry the fiber cables along existing utility rights of way. However, restrictions on use may prevent simply suspending another cable from the transmission towers. Accordingly, an optical cable that can also function as a static wire provides the significant benefit of allowing the use of existing rights of way for telecommunication.

A fiber optic cable that can be used as a static wire is disclosed in U.S. Pat. Nos. 4,416,508 and 4,491,387. These patents disclose several embodiments of the cable that include one or more fibers enclosed in a tube which is then inserted in the axial bore of a metal member. The metal member is then wrapped with metal wires which provide the cable's strength. The cables allow some undefined degree of relative movement of the cable elements and the relationship between the lengths of the fibers, tubes, and metal members is uncontrolled.

U.S. Pat. No. 4,514,058 also discloses an optical cable that can be used as a static wire. One embodiment of the cable includes a central slotted metal member with optical fibers or electrical conductors secured in the slots and then wrapped with metal wires. The very strong central support and the strong wires together resist tensile and radial loads applied to the cable.

Aluminum pipe formed around a dielectric core tube containing the optical fibers is another fiber cable design that can be employed as a static wire. The longitudinal seam of the pipe may be welded to provide mechanical and environmental protection for the core. The pipe may be wrapped with aluminum-clad steel wires to provide the necessary tensile strength. Use of aluminum provides the high conductivity necessary for the cable's function as a static wire and as an occasional lightning target. However, this approach relies mainly on the rigidity and elasticity of the pipe's wall for resisting the radial force applied when the cable is pulled around a bend or sheave wheel. This force, also known as "sidewall pressure", can permanently flatten the pipe if the elastic limit of the pipe material is exceeded. Since radial forces of 1,000 to 5,000 lb/ft can be expected during typical cable installations, a bend radius of less than 200 to 300 times the pipe diameter results in permanent deformation, even for high strength aluminum. A typical bend radius for static wire is 12 inches, thus, aluminum pipes having diameters of 0.3 to 0.4 inches are permanently flattened during normal installation as static wires. This deformation can result in excessive attenuation in the optical fibers or fiber breakage due to pressure exerted on the core by the pipe.

Additional fiber cable designs are disclosed in U.S. Pat. Nos. 3,955,878, 4,388,800, 4,389,088 and 4,491,386 which are directed to submarine installations. The cables disclosed in these patents attempt to protect the fibers from tensile stresses by simply twisting them into helices thus increasing their lengths relative to the cable lengths. Single fibers are laid directly into channels in the cable core so that when the cables are stretched, the extra length of the fibers prevents transmission of the cable elongation to the fibers.

In addition to the problems involved with thermally induced expansion and contraction of an installed cable, overall cable temperature plays an important role in the ability of the fiber optic cables to perform properly. If the fiber is exposed to temperatures above 70° C. or below −40° C., the fiber may be unable to transmit the optimum level of bits of information that it can handle under normal conditions. Thus, it is important to insulate the fibers from excessive temperatures that may exist when the cable is exposed to typical environmental conditions.

In addition, present cable designs do not provide sufficient shielding for the fiber optic cables against excessive heat. For example, if a cable line is struck by lightning, exposure to such excessive and concentrated levels of heat may compromise the optical and mechanical performance of the optical fibers. If such excessive and concentrated levels of heat can be reflected away from the fibers, the performance of such fibers may not be affected.

Thus, there is a need for a static wire assembly having optical fibers housed therein with increased mechanical integrity and improved protection for the optical fibers.

There is a further need for a static wire assembly having optical fibers housed therein where the assembly has improved thermal performance.

There is yet a further need for an optical static wire assembly with mechanical and electrical properties similar to conventional static wires.

There is still a further need for an optical static wire assembly that thermally insulates the fiber optic lines therein.

There is even a further need for an optical static wire assembly that reflects heat away from the optical fibers housed therein.

SUMMARY OF THE INVENTION

The present invention overcomes the problems associated with prior art fiber optic cables and static wire designs by providing an improved optical static wire assembly. The present invention provides an optical static wire assembly comprising a central core which has at least one helical channel of a given twist direction in its periphery. At least one tube containing a suitable dielectric water-blocking compound and optical fibers are positioned in the helical channel and arranged so that there is one tube in each channel. The tube is coated with a thermal insulation material or a heat reflective material, or both. The fibers, at least one per tube, are randomly arranged within the tubes. The assembly formed of the core and the tube is first helically wrapped along its length with metal tape in an overlapping fashion and then longitudinally wrapped along its length with metal wires. Any interstices among the core, the tube, and the tape may be filled with another dielectric water-blocking compound.

In other embodiments, the assembly may include inner and outer protective sheaths of an extrudable thermoplastic material such as polyethylene or polyvinyl chloride. Such protective sheaths may be coated with thermal insulating and heat reflective materials. The outer sheath may also be a suitably impregnated covering of jute or similar material. Also, a strength member comprising one or more longitudinally applied or braided or wrapped fibrous elements such as polyaramide fibers may be included in the cable to provide a high strength-to-weight ratio.

Accordingly, it is an object of the present invention to provide a fiber optic cable with increased mechanical integrity and improved optical fiber protection.

It is another object of the present invention to provide an optic static wire assembly with improved thermal performance.

It is a further object of the present invention to provide an optic static wire assembly with mechanical and electrical properties similar to conventional static wires.

It is yet a further object of the present invention to provide an optic static wire assembly that thermally insulates the optical fibers therein.

It is even a further object of the present invention to provide an optic static wire assembly that reflects heat.

Other objects, features and advantages of the present invention will become apparent upon reading the following detailed description of embodiments of the invention, when taken in conjunction with the drawings and appended claims.

BRIEF DESCRIPTION OF THE DRAWINGS

The present invention will be understood from the following detailed description read in conjunction with the drawings in which:

FIG. 1 shows a cross section of an optical static wire assembly according to the present invention;

FIG. 3 shows a cross section of an alternative embodiment of the present invention.

DESCRIPTION OF THE PREFERRED EMBODIMENT

Figures 2A, 2B:
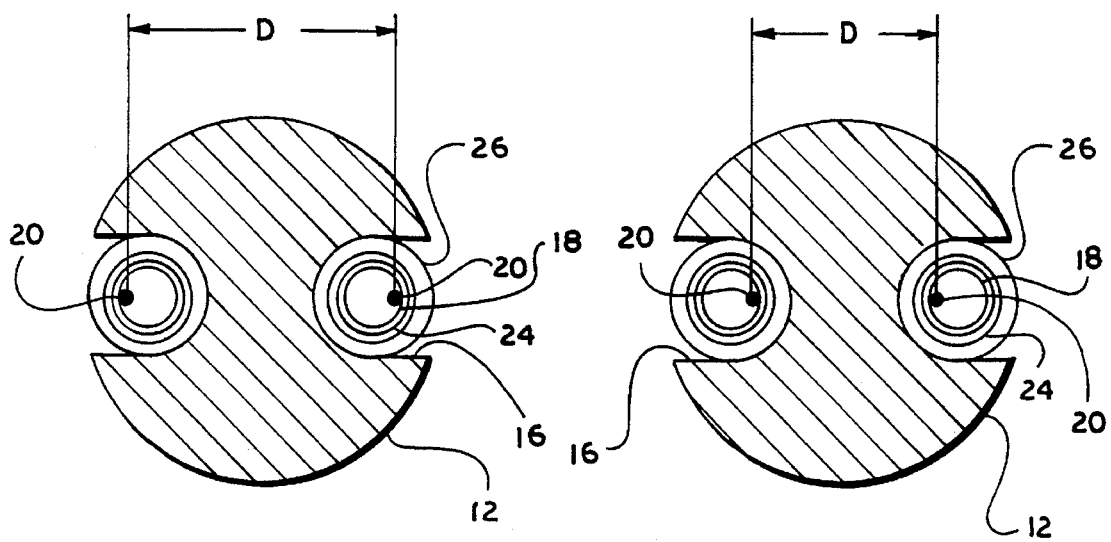
FIG. 2a shows a detailed cross section of the core and tubes of the preferred embodiment of the present invention for one condition of cable elongation.
FIG. 2b shows a detailed cross section of the core and tubes of the preferred embodiment of the present invention for another condition of cable elongation.

In accordance with the present invention, FIG. 1 shows an optical static wire assembly 10. A core 12 consisting of an aluminum rod provides direct support for radial forces and resistance to flattening. The core 12 has one or more channels 16 formed in its periphery. The channels 16 are helically twisted with either right-hand or left-hand twist direction or lay. In other embodiments of the invention, the lay of the helical channels can reverse periodically. The channels 16 are preferably of a cross section small enough with respect to the diameter of the core 12 and of an appropriate helical pitch such that the core acts essentially as a solid rod. It has been found that satisfactory performance is provided by an optical static wire having a helical pitch of the channels in the range of 1.5 inches to 4.0 inches.

Within each of the channels 16 is a flexible dielectric tube 18, made from a polymer such as a high-melting-point fluoropolymer. The tube 18 is positioned to fit snugly in the channel 16 and not protrude beyond the periphery of the core 12. Each tube 18 contains one or more optical fibers 20 and a flexible, dielectric, water-blocking compound 22, such as silicone gel to prevent migration of water through the tube 18 if the tube 18 is cut so as to allow entry of water. The water-blocking compound 22 should be selected so as to be able to withstand anticipated temperature extremes due to the environment and to lightning and fault currents. The flexible compound 22 also helps to maintain the position of the fibers 20 in the tube 18, but the compound must allow the fibers to move. Suitable tube-filling compounds are thixotropic and should be water repellent. In addition, it is preferred that the tube-filling compounds be thermally, chemically and dimensionally stable in both the short and long term.

The material of the tube 18 should have good thermal performance and have stable physical properties. It has been found that satisfactory performance is provided by an optical static wire 10 having a diameter of the helical path of the center lines of the tubes 18 in the range of 0.15 inch to 0.60 inch. The arrangement of the fibers 20 within the tubes 18 is described in more detail below in regard to FIG. 2.

Each tube 18 is covered with a first layer 24. The first layer 24 is comprised of a thermal insulation material which may include hollow glass spheres suspended in a flexible medium such as polyvinyl chloride. The hollow glass spheres are approximately 8–10 microns in diameter and may be made of borosilicate glass. The hollow glass spheres can be purchased from Potters Industries, Inc. of Parsippany, N.J., under the trademark Sphericel 110P8. The first layer 24 is applied to the tube 18 by conventional means including extrusion processing. Alternatively, the first layer may be applied to the tube 18 by immersion withdrawal and spraying techniques. The hollow glass spheres provide insulation characteristics to the first layer 24 by providing a physical structure, borosilicate glass which, itself has a low thermal conductivity, but which is enhanced by its being hollow, thereby trapping a volume of gas which exhibits low thermal conductivity and reduced convective heat transfer. Thus, the glass spheres provides the thermal insulation needed to maintain the performance integrity of the optical fibers 20 within the tube 18.

A second layer 26 is applied over the first layer 24 of the tube 18. The second layer 26 is preferably made of a compound comprising aluminum particles suspended in an epoxy resin which is applied to the outer surface of the first layer 24. The second layer 26 may be applied by extrusion processing or immersion withdrawal and spraying techniques. Such particles may be purchased from Potters Industries, Inc. under the trademark "Conduct-O-Fil PI-1040." The aluminum particles, once properly applied to the outer surface of the first layer 24, provide the necessary heat reflection needed to prevent the optical fibers 20 from malfunctioning. The layers applied to the outer surface of the tubes 18 are shown in FIG. 1.

Also shown in FIG. 1 is a helically applied, overlapped aluminum tape 28. The aluminum tape 28, in conjunction with the tubes 18, first and second tube layers 24, 26 and dielectric compound 22, provides a mechanical and environmental barrier for the optical fibers 20. Although the tubes 18 and the core 12 are effectively sealed against the adverse effects of water and moisture, any hydrogen within the core is free to escape through the overlap areas of the tape 28. The hydrogen concentration around the optical fibers 20 is thus minimized, and excessive optical fiber attenuation is avoided. The conductive tape 28 also provides an electrically conductive connection between the core 12 and a serving of wires 30, allowing fault and lightning currents to be carried throughout the optic static wire assembly 10. The temperature rise due to resistive heating or to possible electrical breakdown of a dielectric tape is thus minimized in those applications requiring the optic static wire assembly 10 to carry significant electrical currents. Further, use of a tape and a core of identical materials prevents electrolytic corrosion that occurs with the contact of dissimilar metals.

In another embodiment of the present invention, any interstices among the tape 28, the tubes 20 and the core 12 are also filled with the dielectric water-blocking compound 22, or another suitable dielectric water-blocking compound with similar properties that may or may not be thermosetting. For some environmental conditions the tape 28 may be excluded from the cable construction. In this embodiment, water can freely exit the optic static wire assembly 10 so that moderate freezing conditions do not damage the assembly.

The tape 28, tubes 18 and core 12 are wrapped with a stranded serving of conductive wires 30. The wires 30 are preferably aluminum-clad steel to provide compatibility with the tape 28 and avoid electrolytic corrosion as discussed above. Aluminum-clad wires have nearly the same strength as conventional galvanized steel wires, yet they weigh as much as 15% less. The aluminum cladding also provides the high conductivity necessary for good fault current and lightning surge current carrying capability. The wires 30 provide the major portion of the strength of the optic static wire assembly 10. The core 12 need not provide significant additional tensile strength for the assembly 10. The steel component of the wires 30 resists most of the creep that might otherwise occur in the aluminum components of the assembly 10 due to the tensile loads of an overhead installation. Although twelve wires 30 are shown in FIG. 1, the tensile strength or fault current capacity can be varied by changing the gauge and/or the number of wires. The rated breaking strength of an optic static wire assembly 10 according to the present invention is thus related to the size, the number, and the type of wires 30 in the outer layer.

The present invention further isolates the optical fibers 20 from axial tensile stresses on the optic static wire assembly 10 by loosely buffering the optical fibers within the tubes 18 that are helically twisted. This arrangement of the optical fibers 20 is achieved by using fibers with comparatively small coated diameters in a tube 18 having a comparatively large inside diameter. When the tube 18 is twisted into a helix, the optical fibers 20 are free to move radially as the pitch and diameter of the helix varies with elongation or contraction of the optic static wire assembly 10. The action of the optical fibers 20 is shown in FIG. 2. FIG. 2a shows the position of the optical fibers when the assembly 10 is contracted and FIG. 2b shows the fiber position when the assembly is stretched. Axial strain on the optical fibers 20 is thus prevented and the fibers are isolated from assembly elongation.

Twisting the assembly 10 and therefore the fibers into helices produces a slight bending stress on the fibers due to fiber bending as it follows the curvature of the helical path. By selecting the diameter and the pitch length of the helix the strain at the fiber surfaces can be held to as little as 0.1%, a value well below the fibers' proof test level.

Positioning the optical fibers 20 in a tube 18 filled with water blocking compound 22 provides an impervious moisture barrier that prevents failure of the optical fibers due to the stresses induced by freeze/thaw thermal cycles which an optical static wire assembly 10 exposed to the elements must endure. Also, the tubes 18 allow the optical fibers 20 to be brought away from the power line while they are still protected, thus easing the requirements on optical fiber termination and coupling. Tubes 18 of high-melting-point dielectric material also thermally isolate and protect the optical fibers 20 from assembly 10 temperature rises caused by lightning surges and fault currents to which an optic static wire assembly is exposed. Suitable tubes 18 are resistant to kinking and radial compression while still remaining flexible, and are relatively chemically inert and thermally stable.

The optic static wire assembly 10 was tested to verify its electrical performance as a static wire. Should faults in the phase conductors occur, a static wire must be capable of carrying the fault current until circuit breakers interrupt the power transmission circuit. Tests were conducted to measure the ability of the cable to withstand the current surge and still maintain acceptable optical transmission characteristics by isolating the optical fibers 20 from the increased cable temperatures. The optical transmission characteristics of the optical fibers 20 were measured by simulated data transmission at 135 megabits per second and no increase in bit-error-rate was detected. After the tests, the assembly 10 was dissected and no damage to the components was observed.

FIG. 3 shows an alternate embodiment of the present invention which is suitable for use as a submarine cable where high resistance to sidewall pressure and high tensile strength are important. The construction of the assembly shown in FIG. 3 is similar to that shown in FIG. 1 except that the helically applied, overlapped tape 28 is replaced by an inner protective sheath 32 of an extrudable thermoplastic material such as polyethylene or polyvinyl chloride. Additional elements shown in FIG. 3 are an outer protective sheath 34 over the stranded serving of wires 30, and an optional flexible water-blocking compound 36 which fills any interstices among the wires 30, the inner sheath 32 and the outer sheath 34. The outer sheath 34 may be an extrudable thermoplastic material such as polyethylene or polyvinylchloride, or it may be another appropriate material such as suitably impregnated jute or the like to protect the cable from water penetration.

Figure 4:
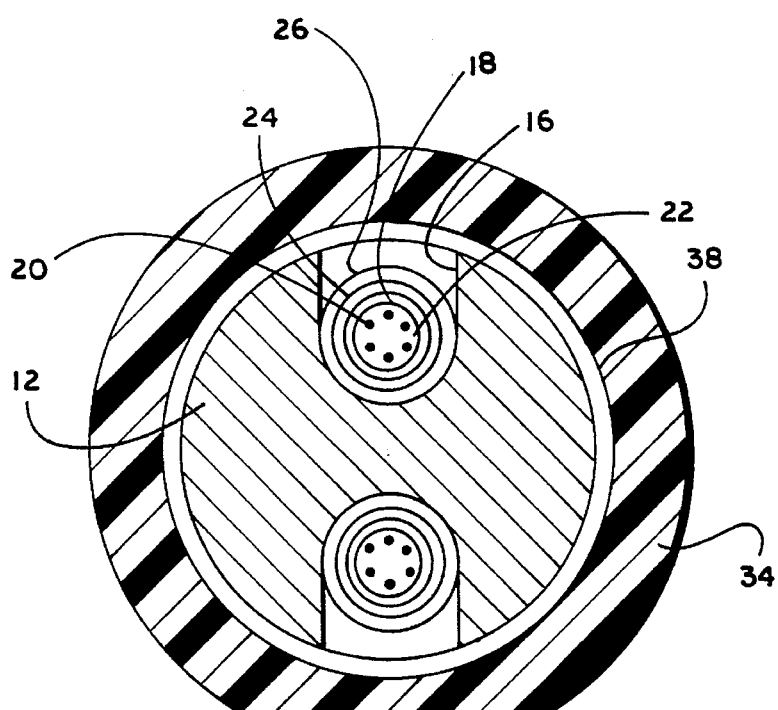
FIG. 4 shows a cross section of a high strength-to-weight ratio assembly according to the present invention.

FIG. 4 shows another embodiment of the present invention in which an assembly is provided which has a high strength-to-weight ratio. Such an assembly finds particular applicability in drilling operations such as oil explorations where signals from or to downhole sensors must be monitored or provided. As shown in FIG. 4, the high strength-to-weight ratio cable comprises a metal core 12 having one or more helical channels 16 in its periphery. The channels 16 each contain a dielectric tube 18 which further contains one or more optical fibers 20 and a flexible dielectric water-blocking compound 22. These elements are as already described in relation to preceding embodiments of the present invention. The assembly shown in FIG. 4 further comprises a strength member 38 of one or more longitudinally applied or braided or helically wrapped fibrous elements such as polyaramide fibers. Polyaramide fibers are marketed by duPont Co. under the trade name KEVLAR. The strength member 38 is covered by an outer protective sheath 34 of an extrudable thermoplastic material, such as polyethylene or polyvinyl chloride, or suitably impregnated coverings of jute or similar materials.

The present invention has been described in relation to particular embodiments which are intended in all respects to be illustrative rather than restrictive. Alternative embodiments will become apparent to those of ordinary skill in the art to which the present invention pertains without departing from its spirit and scope. For example, high conductivity may be provided by any appropriate material other than aluminum, or may even be disregarded altogether in applications not requiring it. Accordingly, the scope of the present invention is defined by the appended claims rather than the foregoing description.

What is claimed is:

1. An optical static wire assembly suitable for use as an overhead static wire, comprising:

an electrically conducting core having a helical channel in its periphery;

a tube containing a dielectric water-blocking compound and at least one optical fiber randomly arranged within the tube, the tube being positioned within said helical channel, the tube having at least one coating, said coating comprising a thermal insulation material; and a plurality of metal wires wrapped around and in electrical contact with the core, and providing at least the major portion of the tensile strength for the assembly.

2. The assembly of claim 1 further comprising a dielectric water-blocking compound filling interstices between the tube, the core and the metal wires.

3. The assembly of claim 2 wherein said water-blocking compound filling said tube and the interstices is hydrogen gas-permeable, whereby hydrogen gas can diffuse through said compound and escape to the atmosphere.

4. The assembly of claim 1 wherein the lay of the helical channel reverses periodically.

5. The assembly of claim 1 wherein the core has a plurality of helical channels, and the assembly comprises a plurality of tubes, with each of said tubes containing at least one optical fiber randomly arranged therein, each of said tubes being positioned within each of a said plurality of channels.

6. The assembly of claim 1 further comprising a helically-wrapped overlapping layer of an electrically conducting tape disposed around said tube and said core and providing electrical contact between said core and said metal wires.

7. The assembly of claim 6 further comprising a dielectric water-blocking compound filling interstices between said tape layer, said tube and said core.

8. The assembly of claim 6 wherein said helically-wrapped overlapping layer is wrapped to allow the escape of hydrogen gas through the overlapped areas.

9. The assembly of claim 6 wherein each of said core, said tape and said metal wires includes the same conductive material.

10. The assembly of claim 9 wherein said conductive material is aluminum.

11. The assembly of claim 10 wherein said metal wires are aluminum-clad steel wires.

12. The assembly of claim 1 wherein said tube comprises a heat-resistant dielectric hydrogen gas-permeable material, whereby hydrogen gas can diffuse through said tube to the atmosphere.

13. The assembly of claim 12 wherein the material of said tube is a fluoropolymer.

14. The assembly of claim 1 wherein said thermal insulation material includes hollow glass spheres.

15. The assembly of claim 14 wherein said hollow glass spheres are suspended in polyvinyl chloride.

16. The assembly of claim 1 wherein said thermal insulation material comprises a heat reflective material.

17. The assembly of claim 16 wherein said heat reflective material comprises aluminum particles.

18. The assembly of claim 17 wherein said aluminum particles are suspended in an epoxy compound.

19. The assembly of claim 1 wherein said coating is sprayed onto said tube.

20. The assembly of claim 1 wherein said coating is extruded over said tube.

21. The assembly of claim 1 wherein said tube is immersed in said coating so that the surface of said tube is covered with said coating.

\* \* \* \* \*